3,127,398
METHOD FOR THE PREPARATION OF A SULFONAMIDE

Hermann Bretschneider and Wilhelm Klötzer, Innsbruck, Austria, assignors to Hoffmann-La Roche Inc., Nutley, N.J., a corporation of New Jersey
No Drawing. Filed Aug. 15, 1960, Ser. No. 49,410
Claims priority, application Switzerland Aug. 20, 1959
4 Claims. (Cl. 260—239.75)

This invention relates to a method for the production of the sulfonamide, 4-sulfanilamido-2,6-dimethoxypyrimidine. This method comprises reacting an alkali salt of sulfanilamide with a pyrimidine of the general formula

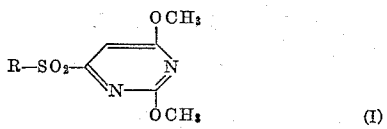

wherein R represents an alkyl, aralkyl, aryl, acylaminoaryl or a hydroxy group, or the O—Me group wherein Me represents a metal atom.

The substituent R in Formula I represents an alkyl group, for example a lower alkyl group such as methyl, ethyl, propyl, isopropyl, butyl, hexyl, etc., an aralkyl group, for example a phenyl lower alkyl group such as benzyl, phenethyl, etc., an aryl group, for example a monocyclic or bicyclic aromatic hydrocarbon group such as phenyl or naphthyl, or an acylaminoaryl group, for example a lower alkanoylaminophenyl group such as acetaminophenyl. R may also represent a hydroxy group. In the latter instance the reaction may also be effected with the hydroxy group in the form of a salt thereof, e.g. an alkali metal salt such as the sodium or potassium salt or an alkaline earth metal salt such as the calcium or magnesium salt. The alkali salt of sulfanilamide used in the reaction may similarly be an alkali metal salt or alkaline earth metal salt.

The reaction of the sulfanilamide salt with the pyrimidine compound is effected by dry heating a mixture of the reactants at a temperature between about 100° and about 150° C. The sulfanilamido radical thereupon replaces the sulfur-containing substituent in the pyrimidine molecule. When 2,6-dimethoxypyrimidine-4-sulfonic acid is used as starting material, it is preferable to heat that starting material with sodium sulfanilamide in molten acetamide.

The pyrimidines of Formula I may be produced by several methods. One preferred method comprises reacting a sulfide of the general formula R'—S—Me wherein R' represents an alkyl, aralkyl, aryl or acylaminoaryl group of the character already described and Me represents a metal atom of the class described, with a 2,6-dimethoxy-4-halopyrimidine and oxidizing the resulting thioether. Any halogen may occur in the halopyrimidine but preferably it is the chloride or bromide. The reaction of the pyrimidine with the sulfide is best effected in an alcohol, e.g. a lower alkanol, at an elevated temperature, for example by heating in ethyl alcohol under reflux. The oxidation of the resulting thioether is preferably effected by means of peracetic acid.

According to another modification, the pyrimidine sulfone of general Formula I may be obtained by the reaction of a metal salt of an appropriately substituted aliphatic or aromatic sulfinic acid with 2,6-dimethoxy-4-halopyrimidine. According to an especially preferred method the sulfinic acid, in the form of its dry alkali salt, is heated with 2,6-dimethoxy-4-chloropyrimidine for several hours in ethylene glycol at 120–160° C. By using the potassium salt of p-acetaminobenzenesulfinic acid as the sulfinic acid salt, the chemical requirements are reduced, for both this salt and the sodium sulfanilamide used in the subsequent step are derived from p-acetaminobenzenesulfonyl chloride.

The method of this invention proceeds with very good yield (in most instances more than 80% of theory) and the 2,6-dimethoxy-4-sulfanilamidopyrimidine obtained is so pure that wasteful purification operations are minimized.

EXAMPLE 1

(A) *4-Phenylsulfonyl-2,6-Dimethoxypyrimidine*

1.15 g. of sodium were dissolved in 30 ml. of absolute alcohol and the solution was treated with 5.2 ml. of thiophenol. After the addition of 8.7 g. of 4-chloro-2,6-dimethoxypyrimidine, the mixture was heated to boiling for two hours excluding moisture. After cooling, sodium chloride was separated from the reaction mixture by filtration (2.7 g.) and the alcohol solution was concentrated in vacuo. Upon the addition of water to the oily residue, crystallization ensued. The crude 4-phenylmercapto-2,6-dimethoxypyrimidine was dried and melted at 45–55° C. The product was dissolved and precipitated from alcohol, then melted at 65–69° C., yield of pure compound 9.5 g. (76% of theory).

2.5 g. of 4-phenylmercapto-2,6-dimethoxypyrimidine were dissolved in 4 ml. of glacial acetic acid and treated at 20° with 16 ml. of peracetic acid (13%). When the exothermic reaction died down, the mixture was heated for 30 minutes on a boiling water bath. After distilling off the acetic acid in vacuo, the residual oil was dissolved in 10 to 15 ml. of methanol and placed in the refrigerator. The crystalline 4-phenylsulfonyl-2,6-dimethoxypyrimidine was isolated and weighed 2.4 g. (85% of theory), M.P. 100–104° C. The product was dissolved and recrystallized from alcohol, then melted at 104——106° C.

(B) *4-Phenylsulfonyl-2,6-Dimethoxypyrimidine*

2 g. of the dry potassium salt of benzenesulfinic acid, 1.7 g. of 4-chloro-2,6-dimethoxypyrimidine and 5 ml. of ethylene glycol were maintained for 5 hours in an oil bath at 140–145° C. (inside temperature). After cooling, 30 ml. of water were added and the mixture was extracted with ether. 2.5 g. of an oil remained which crystallized upon trituration with 10 ml. of alcohol. The 4-phenylsulfonyl-2,6-dimethoxypyrimidine melted at 102–104° C.

(C) *4-Sulfanilamido-2,6-Dimethoxypyrimidine*

1.4 g. of 4-phenylsulfonyl-2,6-dimethoxypyrimidine and 4 g. of sodium sulfanilamide (both dried over potassium hydroxide) were very finely ground and heated in an oil bath for 10 hours at 120° C. (inside temperature). The reaction mixture was taken up in 30 ml. of water and treated with 3 ml. of 2 N sodium hydroxide solution. After standing for one hour at 0°, the turbid solution was filtered and the filtrate was made alkaline with sodium carbonate. After again standing for one hour at 0° C., the precipitate was filtered off (1.9 g. of regenerated sulfanilamide) and the filtrate was neutralized with acetic acid, whereupon crystallization resulted. The isolated crystals of 4-sulfanilamido-2,6-dimethoxypyrimidine weighed 1.3 g. (84% of theory), M.P. 190–196° C.

EXAMPLE 2

(A) *4-Ethylmercapto-2,6-Dimethoxypyrimidine*

5.22 g. of 4-chloro-2,6-dimethoxypyrimidine were dissolved in 15 ml. of absolute alcohol and treated at 20° C. with 2.52 g. of sodium ethylmercaptide in 17 ml. of alcohol. The mixture was heated under reflux for two hours with the exclusion of moisture. After cooling, the precipitated sodium chloride (1.6 g.) was filtered off and the alcoholic filtrate was evaporated to dryness in vacuo. 10 ml. of water were added and the mixture was twice extracted with ether. 5.5 g. of 4-ethylmercapto-2,6-dimethoxypyrimidine remained as a residual oil (92% of theory), B.P. 145° C./12 mm. (bulb tube).

(B) 4-Ethylsulfonyl-2,6-Dimethoxypyrimidine 2 g. of 4-ethylmercapto-2,6-dimethoxypyrimidine were treated with 17 ml. of 13% peracetic acid while cooling with ice. When the exothermic reaction died out and after standing for an additional 10 minutes, the mixture was briefly heated to 80° C. (2 to 3 minutes). The acetic acid was distilled off in vacuo. The oil obtained, upon triturating with water then crystallized. Upon dissolving and recrystallizing from dilute methanol (1:1), the product melted at 108–111° C. (1.2 g., 52% of theory).

(C) 4-Sulfanilamido-2,6-Dimethoxypyrimidine 1 g. of 4-ethylsulfonyl-2,6-dimethoxypyrimidine and 2 g. of sodium sulfanilamide (both well dried) were finely powdered and heated for 2½ hours in an oil bath at 120° C. (inside temperature). After cooling, 20 ml. of water were added and the precipitated sulfanilamide was brought into solution by the addition of a few drops of sodium hydroxide solution. After filtration of 10 mg. of an unidentified compound, the mixture was made alkaline with sodium carbonate and allowed to stand at 0° C. for one hour. In this manner 0.95 g. of regenerated sulfanilamide were obtained. The filtrate was neutralized with acetic acid and the precipitated crystals were isolated (1.0 g., M.P. 180–190° C.). The product was dissolved and recrystallized from alcohol-water and then melted at 195–197° C.

EXAMPLE 3

(A) 4-(p-Acetaminophenylsulfonyl)-2,6-Dimethoxypyrimidine 2.7 g. of the sodium salt of p-acetaminobenzenesulfinic acid were heated with 1.74 g. of 4-chloro-2,6-dimethoxypyrimidine and 5 ml. of ethylene glycol for 3½ hours in an oil bath at 140° C. (inside temperature). After this time, 30 ml. of water were added to the cooled mixture. The addition of a small amount of ether to the resulting oily precipitate initiated crystallization. There was thus obtained 2.0 g. of sulfone melting at 200–210° C. (60% of theory). Upon dissolving and recrystallizing from alcohol (50%), the melting point rose to 215–218° C.

(B) 4-Sulfanilamido-2,6-Dimethoxypyrimidine 1 g. of 4-(p-acetaminophenyl sulfonyl)-2,6-dimethoxypyrimidine was finely powdered with 2 g. of sodium sulfanilamide, then after the addition of 1 ml. of dimethylformamide the mixture was heated in an oil bath for six hours at 125° C. (bath temperature). The nearly homogenous fused mass was cooled and dissolved in 20 ml. of water, then made alkaline with sodium carbonate solution and maintained at 0° C. for one hour, 1.1 g. of sulfanilamide were recovered. The filtrate, upon neutralization, gave 0.6 g. of crystalline 4-sulfanilamido-2,6-dimethoxypyrimidine having a melting point of 175–192° C. (65% of theory). By dissolving and recrystallizing from 80% alcohol, the melting point rose to 196–200° C.

EXAMPLE 4

4-Sulfanilamido-2,6-Dimethoxypyrimidine 2 g. of sodium sulfanilamide, 0.5 g. of 2,6-dimethoxypyrimidine - 4 - sulfonic acid and 2 g. of acetamide were heated for five hours in an oil bath at 120° C. (inside temperature). The melt was taken up in 30 ml. of water and made alkaline with sodium carbonate. After standing for one hour at 0° C., 1.5 g. of sulfanilamide were filtered off and the filtrate neutralized with acetic acid. There were thus obtained 0.2 g. of crystalline 4-sulfanilamido-2,6-dimethoxypyrimidine melting at 195° C. Upon dissolving and recrystallizing from alcohol, the compound melted at 202° C.

We claim:
1. A method for the production of 4-sulfanilamido-2,6-dimethoxypyrimidine which comprises reacting a pyrimidine compound of the formula

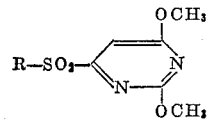

wherein R represents a member of the group consisting of lower alkyl, phenyl lower alkyl, phenyl, naphthyl, lower alkanoylaminophenyl, hydroxy and —OMe, wherein Me represents a metal atom selected from the group consisting of alkali metal and alkaline earth metal, with an alkali salt of sulfanilamide.

2. A method according to claim 1 wherein the reaction is effected by dry heating a mixture of the reactants at a temperature between 100 and 150° C.

3. A method for the production of 4-sulfanilamido-2,6-dimethoxypyrimidine which comprises heating 2,6-dimethoxypyrimidine-4-sulfonic acid with sodium sulfanilamide in molten acetamide.

4. The method of preparing 4-sulfanilamido-2,6-dimethoxy pyrimidine by reacting 4-methylsulfonyl-2,6-dimethoxy pyrimidine with an alkali metal salt of sulfanilamide.

References Cited in the file of this patent

UNITED STATES PATENTS

| | | |
|---|---|---|
| 2,389,128 | Bambas | Nov. 20, 1945 |
| 2,456,258 | Dohrn et al. | Dec. 14, 1948 |
| 2,478,146 | William et al. | Aug. 2, 1949 |
| 2,602,790 | Amstutz | July 8, 1952 |

OTHER REFERENCES

Greenbaum: Journal of the American Chemical Society, vol. 76, pages 6052–6054 (1954).